US011615303B2

United States Patent
Park et al.

(10) Patent No.: US 11,615,303 B2
(45) Date of Patent: Mar. 28, 2023

(54) ELECTRONIC DEVICE FOR CLASSIFYING CLASSES, ELECTRONIC DEVICE FOR PROVIDING CLASSIFICATION MODEL FOR CLASSIFYING CLASSES, AND METHOD FOR OPERATING THE SAME

(71) Applicant: SAMSUNG ELECTRONICS CO., LTD., Suwon-si (KR)

(72) Inventors: Chanjong Park, Suwon-si (KR); Jiman Kim, Suwon-si (KR); Dongha Bahn, Suwon-si (KR)

(73) Assignee: Samsung Electronics Co., Ltd., Sawon-si (KR)

( * ) Notice: Subject to any disclaimer, the term of this patent is extended or adjusted under 35 U.S.C. 154(b) by 539 days.

(21) Appl. No.: 16/797,183

(22) Filed: Feb. 21, 2020

(65) Prior Publication Data

US 2020/0272898 A1    Aug. 27, 2020

(30) Foreign Application Priority Data

Feb. 25, 2019  (KR) .......................... 10-2019-0021868
Nov. 15, 2019  (KR) .......................... 10-2019-0147001

(51) Int. Cl.
*G06N 3/08*     (2006.01)
*G06N 3/04*     (2006.01)

(52) U.S. Cl.
CPC ................. *G06N 3/08* (2013.01); *G06N 3/04* (2013.01)

(58) Field of Classification Search
CPC ................................... G06N 3/08; G06N 3/04
See application file for complete search history.

(56) References Cited

U.S. PATENT DOCUMENTS

| | | | |
|---|---|---|---|
| 10,049,323 B1* | 8/2018 | Kim | ................ G06N 3/084 |
| 10,055,685 B1* | 8/2018 | Arel | ................ G06N 20/00 |
| 2005/0105794 A1 | 5/2005 | Fung | |
| 2013/0322740 A1 | 12/2013 | Chen et al. | |
| 2015/0332172 A1 | 11/2015 | Konoshima et al. | |
| 2016/0275415 A1 | 9/2016 | Yoo et al. | |
| 2017/0078549 A1 | 3/2017 | Emtman et al. | |
| 2018/0247113 A1* | 8/2018 | Yang | ................ G06K 9/6274 |
| 2019/0043193 A1* | 2/2019 | Odaibo | ................ G06N 3/0454 |

FOREIGN PATENT DOCUMENTS

KR     10-2016-0121999     10/2016

* cited by examiner

*Primary Examiner* — Stephen G Sherman
(74) *Attorney, Agent, or Firm* — Nixon & Vanderhye P.C.

(57) ABSTRACT

According to an embodiment, an electronic device comprises at least one processor and a memory, wherein the memory stores instructions that, when executed, cause the at least one processor to control the electronic device to: obtain data to be classified, obtain a feature vector from the data by performing convolution on the data and a plurality of filters using a classification model stored in the memory, identify outputs corresponding to subfeatures using a split layer including the subfeatures resulting from splitting the feature vector, and output a class corresponding to the data based on the outputs.

12 Claims, 10 Drawing Sheets

ELECTRONIC DEVICE FOR CLASSIFYING CLASSES, ELECTRONIC DEVICE FOR PROVIDING CLASSIFICATION MODEL FOR CLASSIFYING CLASSES, AND METHOD FOR OPERATING THE SAME

CROSS-REFERENCE TO RELATED APPLICATIONS

This application is based on and claims priority under 35 U.S.C. § 119 to Korean Patent Application No. 10-2019-0021868, filed on Feb. 25, 2019, in the Korean Intellectual Property Office, and Korean Patent Application No. 10-2019-0147001, filed on Nov. 15, 2019, in the Korean Intellectual Property Office, the disclosures of which are incorporated by reference herein in their entireties.

BACKGROUND

Field

The disclosure relates to an electronic device for classifying classes, an electronic device for providing a classification model for classifying classes, and a method for operating the same.

Description of Related Art

Artificial intelligence systems may refer, for example, to computer systems capable of implementing human-like intelligence, which allows machines to do self-learning, make decisions, and provide a better recognition as they are used more. Artificial intelligence technology may include element techniques, such as machine learning (deep learning) which utilizes algorithms capable of classifying and learning the features of entered data on their own and copying the perception or determination by the human brain using machine learning algorithms.

Such element techniques may include linguistic understanding which recognizes human languages/words, visual understanding which recognizes things as if humans visually do, inference/prediction which determines information and performs logical inference and prediction, knowledge expression which processes human experience information as knowledge data, and motion control which controls robot motions and driver-less vehicles. Linguistic understanding may refer, for example, to technology for recognizing and applying/processing a human being's language or text, and this encompasses natural language processing, machine translation, dialog system, answering inquiries, and speech recognition/synthesis. Visual understanding may refer, for example, to a technique of perceiving and processing things as do human eyes, and this encompasses object recognition, object tracing, image search, human recognition, scene recognition, space understanding, and image enhancement. Inference prediction may refer, for example, to a technique of determining and logically inferring and predicting information, encompassing knowledge/probability-based inference, optimization prediction, preference-based planning, and recommendation. Knowledge expression may refer, for example, to a technique of automatically processing human experience information, covering knowledge buildup (data production/classification) and knowledge management (data utilization). Operation control may refer, for example, to a technique of controlling the motion of robots and driverless car driving, and this encompasses movement control (navigation, collision, driving) and maneuvering control (behavior control).

A classification model for classifying classes based on input data may be generated using learning data. For example, the classification model may omni-directionally process the input data, with various parameters included in the classification model set as default. An electronic device may perform learning by adjusting the parameters based on the results of processing and a designated value (e.g., a label). For example, the electronic device may adjust the parameters by performing reverse propagation. However, when an error occurs in the label, the electronic device performs learning with a wrong result and is thus likely to produce an erroneous classification model. For example, the learning data may be labeled by a human being, and a mistake may cause a wrong label to be assigned to the learning data. The classification accuracy of the classification model provided through learning on the label may be lowered.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide an electronic device that is configured to split a feature vector (or feature image) obtained via a convolution layer to a designated size and to perform learning using the split layers to thereby provide a classification model and a method for operating the same. According to various example embodiments, an electronic device that may classify classes of input data using a classification model including split layers and a method for operating the same may be provided.

In accordance with various example embodiments, an electronic device comprises at least one processor and a memory, wherein the memory stores instructions that, when executed, cause the at least one processor to control the electronic device to: obtain data to be classified, obtain a feature vector from the data by performing convolution on the data and a plurality of filters using a classification model stored in the memory, identify outputs respectively corresponding to subfeatures using a split layer including subfeatures resulting from splitting the feature vector, and output a class corresponding to the data based on the outputs.

In accordance with various example embodiments, a non-transitory computer-readable storage medium storing instructions that, when executed, cause an electronic device to perform operations for classifying data to be classified, is provided, the operations comprising: obtaining the data to be classified, obtaining a feature vector from the data by performing convolution on the data and a plurality of filters using a classification model, identifying outputs respectively corresponding to subfeatures using a split layer including subfeatures resulting from splitting the feature vector, and outputting a class corresponding to the data based on the outputs.

In accordance with various example embodiments, an electronic device comprises at least one processor and a memory, wherein the memory stores instructions that, when executed, cause the at least one processor to control the electronic device to: obtain data for learning, obtain a feature vector from the data for learning by performing convolution on the data and a plurality of filters using a classification model stored in the memory, identify outputs respectively corresponding to subfeatures using a split layer including subfeatures resulting from splitting the feature vector, and adjusting at least one parameter of the classification model based on a loss based on labeling information associated with the data for learning and the outputs.

In accordance with various example embodiments, at least one non-transitory computer-readable storage medium storing instructions that, when executed, cause an electronic device to perform operations for learning a classification model using data for learning, is provided, the operations comprising: obtaining the data for learning, obtaining a feature vector from the data for learning by performing convolution on the data and a plurality of filters using the classification model, identifying outputs respectively corresponding to subfeatures using a split layer including subfeatures resulting from splitting the feature vector, and adjusting at least one parameter of the classification model based on a loss based on labeling information associated with the data for learning and the outputs.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Throughout the drawings, like reference numerals will be understood to refer to like parts, components, and structures.

DETAILED DESCRIPTION

Figure 1:
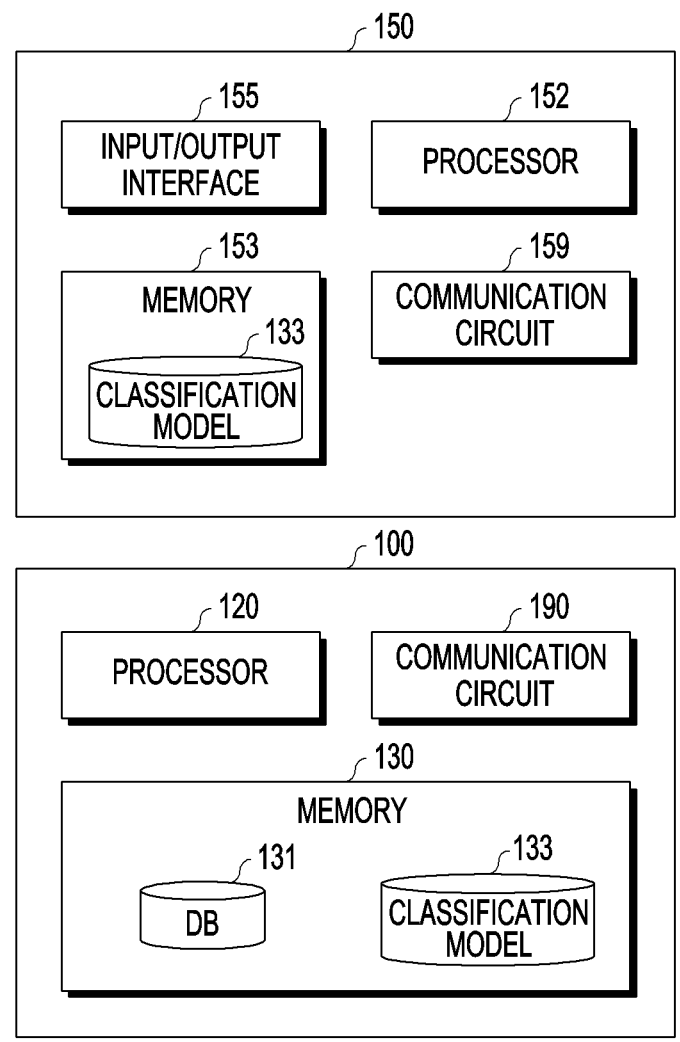
FIG. 1 is a block diagram illustrating an example electronic device according to an embodiment.

FIG. 1 is a block diagram illustrating an example electronic device according to an embodiment.

Referring to FIG. 1, according to an embodiment, an electronic device 100 may include at least one of a processor (e.g., including processing circuitry) 120, a memory 130, and/or a communication circuit 190. An electronic device 150 may include at least one of a processor (e.g., including processing circuitry) 152, a memory 153, an input/output interface (e.g., including input/output circuitry) 155, and/or a communication circuit 159. According to an embodiment, the electronic device 100 may generate and learn (or train) a classification model 133, and the electronic device 150 may classify classes of input data for classification using the classification model 133. The example in which the electronic device 100 generates and learns the classification model 133 and the electronic device 150 classifies classes is merely for illustration purposes and it may be apparent to one of ordinary skill in the art that the electronic device 100 and the electronic device 150 do not only generate and learn the classification model 133 but may also classify classes of the data for classification using the classification model 133. Although it is described below that the operations associated with generation and/or learning of the classification model are performed by the electronic device 100, and classification of classes using the classification model or interpretation of the results of classification is performed by the electronic device 150, this is merely for ease of description. As described above, each of the electronic devices 100 and 150 may perform all of generation and/or learning of the classification model and classification of classes using the classification model.

According to an embodiment, the processor 120 may include various processing circuitry and generate and learn the classification model 133 using a database 131. The processor 152 may include various processing circuitry and classify data for classification obtained via the input/output interface 155 using the classification model 133.

At least one of the processor 120 or the processor 152 may execute, e.g., software (e.g., a program) to control at least one other component (e.g., a hardware or software component) connected with at least one of the processor 120 or the processor 152 and may process or compute various data. According to one embodiment, as at least part of the data processing or computation, at least one of the processor 120 or the processor 152 may load an instruction or data received from another component onto a volatile memory, process the instruction or data stored in the volatile memory, and store resulting data in a non-volatile memory 153. According to an embodiment, at least one of the processor 120 or processor 152 may include a central processing unit (CPU) and/or a graphical processing unit (GPU). If the processor 120 or processor 152 operates a GPGPU (general-purpose computing on graphics processing units) including a CPU and a GPU, the CPU may execute computer-executable instructions and may be implemented into a plurality of processing units. The plurality of processing units in the GPU may process input data and output resultant data. At least one of the processor 120 or processor 152 may include a volatile memory (e.g., a cache memory, register, or random-access memory (RAM)). The GPU may include a shader processor, a texture mapping unit, a rendering output unit, a frame buffer, or a texture cache, and the GPU may split input data and perform parallel processing. The CPU and GPU are not limited in kind and it will be apparent to one of ordinary skill in the art that any other devices capable of computational processing may be used as the processor 120 or processor 152.

The memory 130 may store a database 131 that may include a set of data for learning and a classification model 133 generated by the database 131. The database 131 may include various kinds of data for learning and their corresponding labeling information. Any kind of data capable of splitting classes may be used as the various kinds of data and may include data for visual understanding (e.g., images), data for linguistical understanding, data for inference prediction, and data for operation control. The labeling information may indicate the class of the data and may be determined, e.g., during the course of preparing for data for learning. The memory 153 may store the classification model 133. For example, the electronic device 150 may receive the classification model 133 from the electronic device 100 via the communication circuit 159. The electronic device 100 may transmit the generated and learned classification model 133 to the electronic device 150 via the communication circuit 190.

The memory 130 or memory 153 may store various data used by at least one component of the electronic device 100 or electronic device 150. The various data may include, for example, software (e.g., the program) and input data or output data for a command related thereto. The memory 130 or memory 153 may include a volatile or non-volatile memory.

As set forth herein, the "electronic device 100 or electronic device 150 performs a particular operation" may refer, for example to various hardware devices, e.g., a control circuit, such as the processor 120 or processor 152, included in the electronic device 100 or electronic device 150 performing the particular operation. The "electronic device 100 or electronic device 150 performs a particular operation" may also refer, for example, to the processor 120 or processor 152 controlling another hardware device to perform the particular operation. The "electronic device 100 or electronic device 150 performs a particular operation" may also refer, for example, to as an instruction for performing the particular operation stored in a storage circuit (e.g., the memory 130 or memory 153) of the electronic device 100 or electronic device 150 being executed, the processor 120 or processor 152 or another hardware device may be triggered to perform the particular operation or the instruction is stored in the storage circuit.

The communication circuit 159 and/or communication circuit 190 may establish a direct (e.g., wired) communication channel or a wireless communication channel with an external electronic device or may support communication through the established communication channel. The communication circuit 159 or communication circuit 190 may include one or more communication processors that are operable independently from the processor 120 and supports direct (e.g., wired) communication or wireless communication. According to an embodiment, the communication circuit 159 or communication circuit 190 may include a wireless communication circuit (e.g., a cellular communication circuit, a short-range wireless communication circuit, or a global navigation satellite system (GNSS) communication circuit) or a wired communication circuit (e.g., a local area network (LAN) communication circuit or a power line communication (PLC) circuit). A corresponding one of these communication circuits may communicate with the external electronic device via a first network (e.g., a short-range communication network, such as Bluetooth™, wireless-fidelity (Wi-Fi) direct, or infrared data association (IrDA)) or a second network (e.g., a long-range communication network, such as a cellular network, the Internet, or a computer network (e.g., LAN or wide area network (WAN)). These various types of communication circuits may be implemented as a single component (e.g., a single chip), or may be implemented as multi components (e.g., multi chips) separate from each other. The wireless communication circuit may identify and authenticate the electronic device using subscriber information (e.g., international mobile subscriber identity (IMSI)) stored in the subscriber identification module.

The communication circuit 159 may be connected wiredly with the communication circuit 190. For example, the interface between the communication circuit 159 and the communication circuit 190 may include, for example, a high definition multimedia interface (HDMI), a universal serial bus (USB) interface, a secure digital (SD) card interface, or an audio interface. In this case, the electronic device 100 or electronic device 150 may include a connecting terminal for connection. According to an embodiment, the connecting terminal may include, for example, a HDMI connector, a USB connector, a SD card connector, or an audio connector (e.g., a headphone connector).

The input/output interface 155 may include various input/output circuitry and receive data for classification from the outside. The input/output interface 155 may output information for classes into which the data for classification has been classified. The input/output interface 155 may receive data via a wired connection interface from another electronic device in which case the above-described various interfaces may be included. The electronic device 150 may receive data via the communication circuit 159 from other electronic devices. According to an embodiment, the input/output interface 155 may include, various input/output circuitry, such as, for example, and without limitation, a microphone, a mouse, a keyboard, a digital pen (e.g., a stylus pen), or the like. The input/output interface 155 may output sound signals to the outside. The input/output interface 155 may include, for example, a speaker or a receiver, or the like. The speaker may be used for general purposes, such as playing multimedia or playing record, and the receiver may be used for an incoming calls. According to an embodiment, the receiver may be implemented as separate from, or as part of the speaker. The input/output interface 155 may visually provide information. The input/output interface 155 may include, for example, a display, a hologram device, or a projector and control circuitry to control a corresponding one of the display, hologram device, and projector. According to an embodiment, the input/output interface 155 may include touch circuitry adapted to detect a touch, or sensor circuitry (e.g., a pressure sensor) adapted to measure the intensity of force incurred by the touch. The input/output interface 155 may convert a sound into an electrical signal and vice versa. According to an embodiment, the input/output interface 155 may output sounds. The input/output interface 155 may detect an operational state (e.g., power or temperature) of the electronic device 150 or an external environmental state (e.g., a state of a user) and generate an electrical signal or data value corresponding to the detected state. According to an embodiment, the input/output interface 155 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, etc. The input/output interface 155 may convert an electrical signal into a mechanical stimulus (e.g., a vibration or motion) or electrical stimulus which may be recognized by a user via his tactile sensation or kinesthetic sensation. According to an embodiment, the input/output interface 155 may include, for example, a motor, a piezoelectric element, or an electric stimulator. The input/output interface 155 may capture a still image or moving images. According to an embodiment, the input/output interface 155 may include one or more lenses, image sensors, image signal processors, or flashes. According to an embodiment, the input/output interface 155 may output the classified classes via a wired interface.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Figure 2:
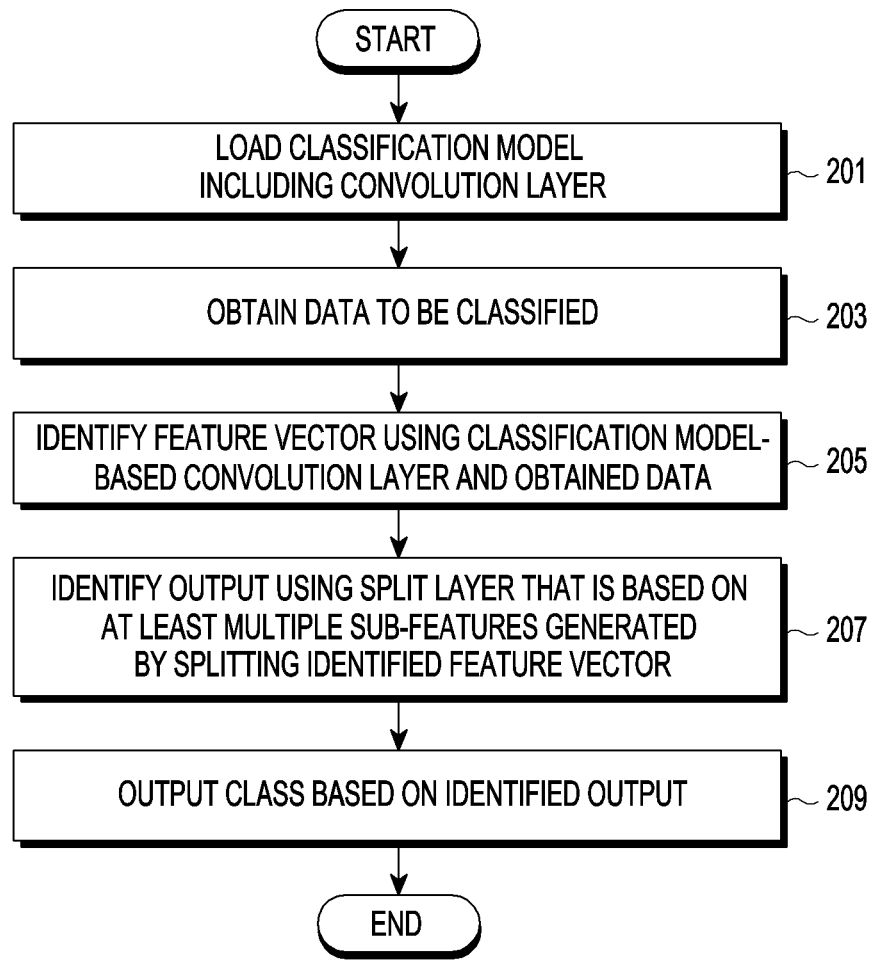
FIG. 2 is a flowchart illustrating an example method for operating an electronic device according to an embodiment.
Figure 3:
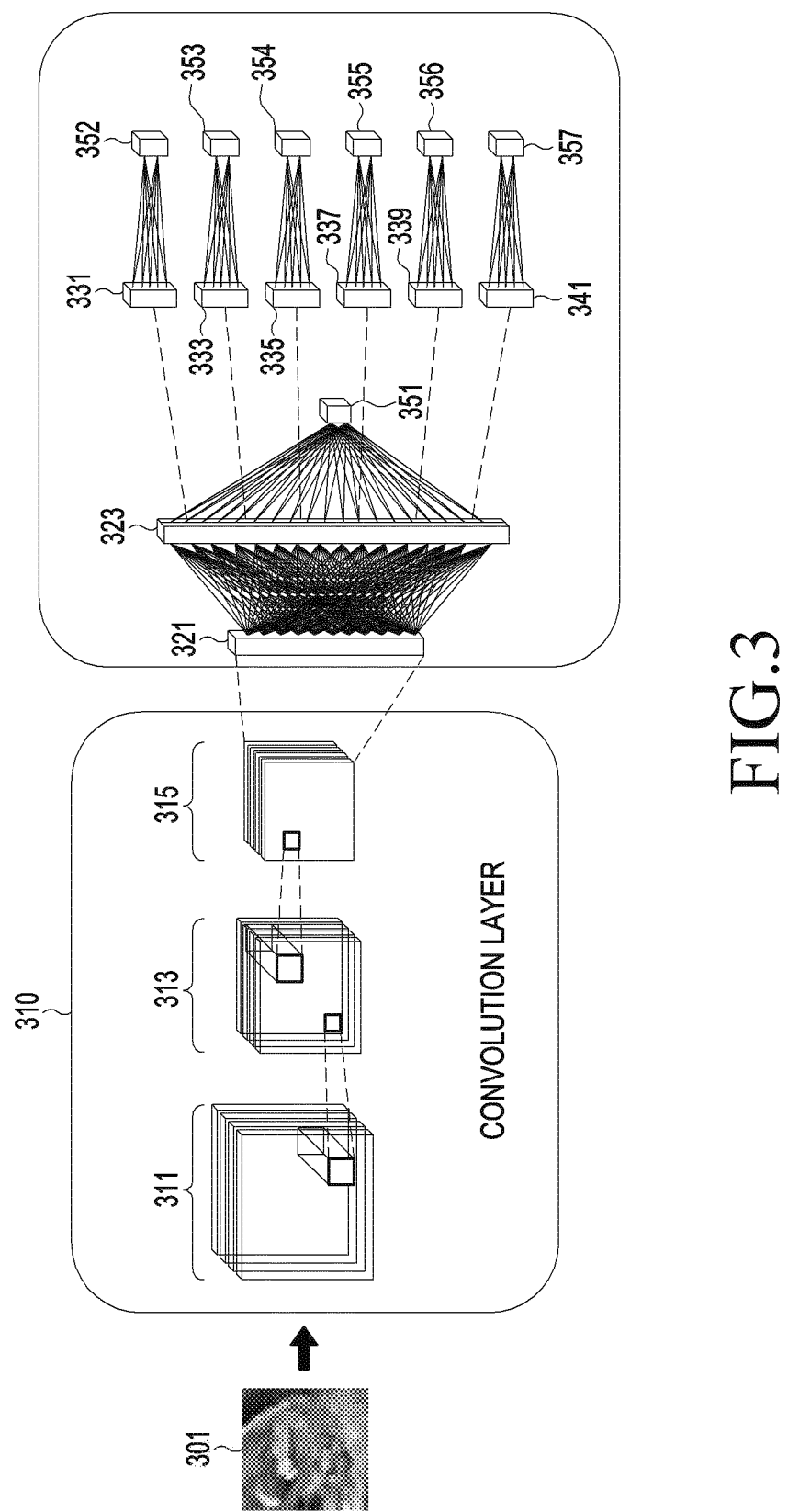
FIG. 3 is a diagram illustrating layers of an example classification model according to an embodiment.

FIG. 2 is a flowchart illustrating an example method for operating an electronic device according to an embodiment. The embodiment of FIG. 2 is described in greater detail with reference to FIG. 3. FIG. 3 is a diagram illustrating layers of an example classification model according to an embodiment.

Referring to FIG. 2, according to an embodiment, an electronic device 150 may load a classification model (e.g., the classification model 133) including a convolution layer in operation 201. According to an embodiment, the classification model may include, for example, and without limitation, a convolution layer, a single layer obtained according to a convolution process, and a split layer generated by splitting the single layer. The classification model may be generated and learned by the electronic device 100, and the electronic device 150 may receive the classification model from the electronic device 100. As set forth above, the electronic device 150 may directly generate and learn the classification model.

Referring to FIG. 3, according to an embodiment, the classification model may include the convolution layer 310. The classification model may include a single layer 321 connected to the convolution layer 310 and a split layer 323 generated by splitting the vector of the single layer 321. The single layer 321 may be referred to, for example, and without limitation, as a feature vector, feature layer, feature, fully connected layer, or the like. The split layer 323 may include subfeatures 331, 333, 335, 337, 339, and 341 generated by splitting the vector of the single layer 321 to a designated size. The split layer 323 may include the subfeatures 331, 333, 335, 337, 339, and 341. The split layer 323 may be implemented to include all of the single layer 321 and the subfeatures 331, 333, 335, 337, 339, and 341. The split layer 323 may include all or only some of the subfeatures generated by splitting the single layer 321. The subfeatures 331, 333, 335, 337, 339, and 341 of the single layer 321 may have the same size (e.g., the same number of components) or, depending on implementation, may have different sizes. The split size may be, for example, and without limitation, 2, 4, 5, 8, 10, 20, 25, 50, 100, 200, 250, or 500 for the single layer with a size of 1,000, but is not limited thereto. The number of splits may be designated in the classification model or may be determined by a user input. For example, when the classification model is learned, the user may input information for the split size, and the electronic device 100 may split the feature vector based on the input information. For example, if the split size is 2, the single layer with a size of 1,000 may be split into 500 subfeatures. In this case, the split layer may include one single layer with a size of, e.g., 1,000 and 500 subfeatures each having a size of 2. The subfeatures 331, 333, 335, 337, 339, and 341 may individually (respectively) connect to the output layers 351, 352, 353, 354, 355, 356, and 357. Each of the output layers 351, 352, 353, 354, 355, 356, and 357 may include an output vector(s) corresponding to at least one class. For example, if the classification model is a model for recognizing a specific object (e.g., a tumor), each of the output layers 351, 352, 353, 354, 355, 356, and 357 may include an output vector including classes of true/false (e.g., 0/1). Although FIG. 3 illustrates that the number of classes in each of the output layers 351, 352, 353, 354, 355, 356, and 357 is two, this is merely an example, and it will be apparent to one of ordinary skill in the art that the number of classes is not limited to a specific one. In the embodiment shown in FIG. 3, the output layer 351 is fully connected with, For example, the single layer 321, the output layers 352, 353, 354, 355, 356, and 357 are fully connected with the subfeatures 331, 333, 335, 337, 339, and 341. This may refer, for example, to the split layer 323 including the single layer 321 and the subfeatures 331, 333, 335, 337, 339, and 341 generated by splitting the single layer 321. However, as described above, according to an embodiment, the classification model may be implemented to include the split layer 323 that does not include the single layer 321 in which case such a structure may also be possible where the subfeatures 331, 333, 335, 337, 339, and 341 are connected with the output layers 352, 353, 354, 355, 356, and 357.

In operation 203, according to an embodiment, the electronic device 150 may obtain data to be classified. For example, it is assumed for ease and convenience of illustration that the classification model stored in the electronic device 150 is a model for recognizing a specific object (e.g., a tumor) and the true/false classes are included. The electronic device 150 may obtain a classification model that the electronic device 100 obtains by learning an image including multiple specific objects and store the classification model. The electronic device 150 may receive an image required to be classified (e.g., the image 301 of FIG. 3) via the input/output interface 155 and/or the communication circuit 159.

In operation 205, according to an embodiment, the electronic device 150 may identify the feature vector using the classification model-based convolution layer and the obtained data. For example, the electronic device 150 may generate a plurality of first feature maps 311 as shown in FIG. 3. The electronic device 150 may slide, on the image 301, each of a plurality of filters defined in the classification model. Filter may also be referred to as a kernel depending on implementation. An element in the matrix corresponding to the filter, e.g., a weight, may be determined based on the result learned by the electronic device 100. The electronic device 150 may convolute at least some areas in the image 301 with the filter while sliding and, based on the result of convolution, may identify each element value of the feature map. If sliding ends, the values of all the elements in one feature map may be identified. The electronic device 150 may identify the values of all the elements in another feature map using the next filter. Thus, the number of first feature maps 311 may correspond to, e.g., the number of filters. Upon sliding, the stride is not limited. The electronic device 150 may generate second feature maps 313 from the first feature maps 311. The electronic device 150 may generate third feature maps 315 from the second feature maps 313. The process in which the electronic device 150 generates the second feature maps 313 from the first feature maps 311 and/or the process in which the electronic device 150 generates the third feature maps 315 from the second feature maps 313 may include, for example, and without limitation, padding, pulling, and/or convolution. The parameters and/or algorithm (e.g., the weight in the filter, offset after convolution, kind of activation function, information used while padding, and/or pulling scheme) used during the padding, pulling, and convolution processes may be pre-designated in the classification model. The number of times in which feature maps are generated is not limited. According to an embodiment, the electronic device 150 may identify feature maps 311, 315, and 315 based on, for example, and without limitation, a classification model of ResNet 50, but various kinds of classification models, such as, for example, and without limitation, LeNet-5, AlexNet, VGGNet, or the like, may be implemented without limitations. In operation 205, the electronic device 150 may identify the feature vector, e.g., the single layer 321, from the third feature maps 315.

In operation 207, according to an embodiment, the electronic device 150 may identify outputs (e.g., the output layers 351, 352, 353, 354, 355, 356, and 357) using the split layer which is based on at least a plurality of subfeatures (e.g., the subfeatures 331, 333, 335, 337, 339, and 341) generated by splitting the identified feature vector (e.g., the single layer 321). As set forth above, the output layers 351, 352, 353, 354, 355, 356, and 357 may be represented as a vector corresponding to each outputtable class.

In operation 209, the electronic device 150 may output the class including the image 301 based on the identified output. For example, the electronic device 150 may output a class of true or false as to whether the image 301 includes a specific object (e.g., a tumor). The classification model generated and learned by the electronic device 150 may define parameters and/or an algorithm (e.g., at least one of the weight, bias, and/or activation function) for connection from the split layer 323 to each of the output layers 351, 352, 353, 354, 355, 356, and 357, and the electronic device 100 may identify the values of the vector of each of the output layers 351, 352, 353, 354, 355, 356, and 357 based on the parameters in the classification model. As described above, the split layer 323 may include all of the single layer 321 and the subfeatures 331, 333, 335, 337, 339, and 341, may include all of the subfeatures 331, 333, 335, 337, 339, and 341, or may include some of the subfeatures 331, 333, 335, 337, 339, and 341.

Figure 4A:
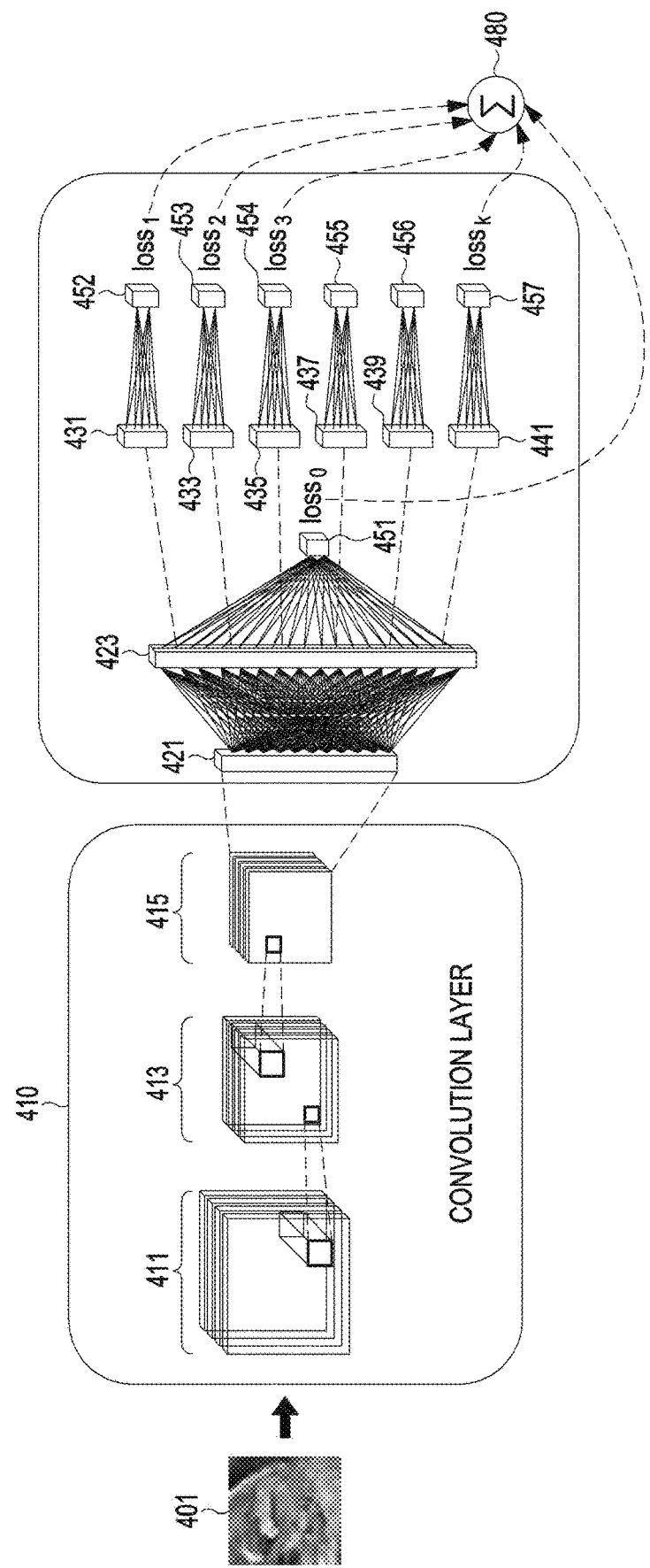
FIG. 4A is a diagram illustrating layers of an example classification model according to an embodiment.
Figure 4B:
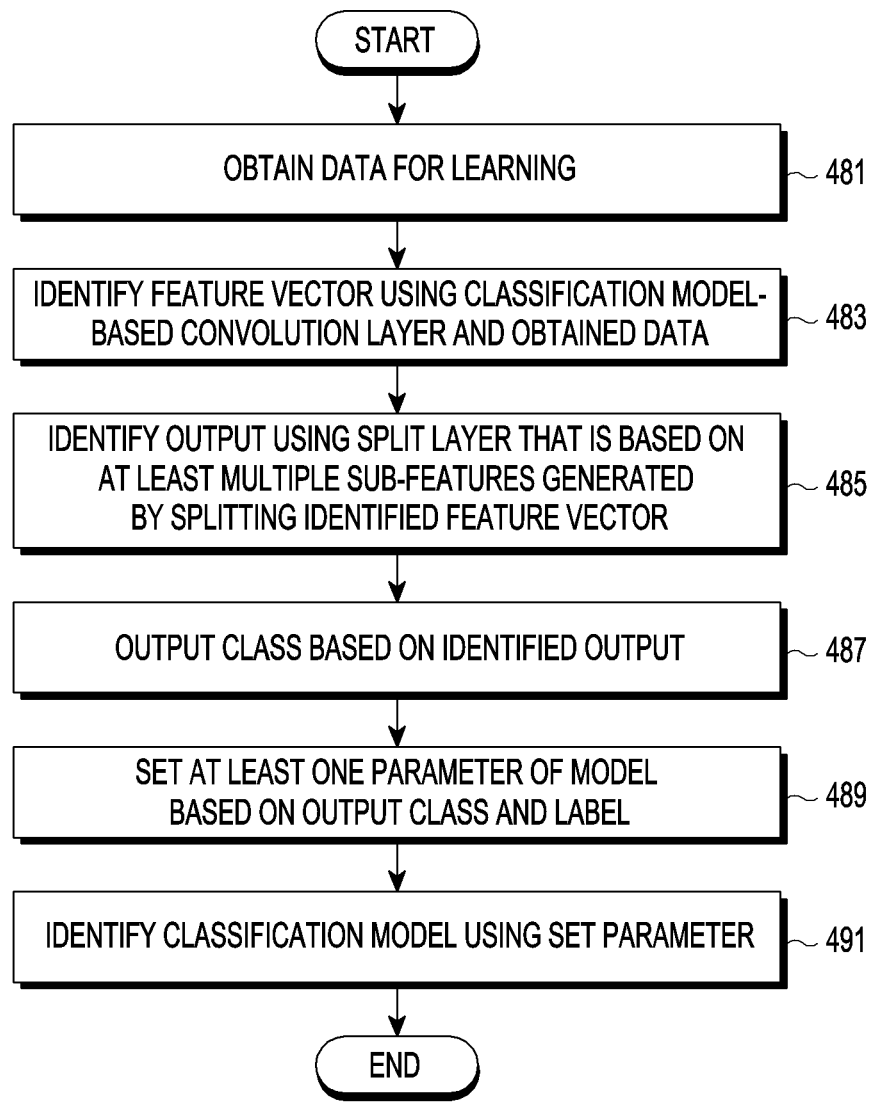
FIG. 4B is a flowchart illustrating an example method for operating an electronic device according to an embodiment.

FIG. 4A is a diagram illustrating layers of an example classification model according to an embodiment. The embodiment of FIG. 4A is described in greater detail with reference to FIG. 4B. FIG. 4B is a flowchart illustrating an example method for operating an electronic device according to an embodiment.

Operations of FIGS. 4A and 4B, which have been described above in connection with FIGS. 2 and 3 are briefly described below.

According to an embodiment, the electronic device 100 for generating and learning a classification model may obtain data 401 for learning in operation 481 as shown in FIGS. 4A and 4B. In operation 483, the electronic device 100 may identify a feature vector, e.g., the single layer 421, using the obtained data and a classification model-based convolution layer 410. The convolution layer 410 may include, e.g., a plurality of feature maps 411, 413, and 415. In operation 485, the electronic device 100 may identify outputs (e.g., output layers 451, 452, 453, 454, 455, 456, and 457) using a split layer which is based on at least a plurality of subfeatures 431, 433, 435, 437, 439, 441, and 451 generated by splitting the identified feature vector, e.g., the single layer 421. The split layer 423 may include, e.g., the single layer 421 and at least some of the subfeatures 431, 433, 435, 437, 439, 441, and 451 resulting from splitting the single layer 421. Or, the split layer 423 may include only at least some of the subfeatures 431, 433, 435, 437, 439, 441, and 451 resulting from splitting the single layer 421.

According to an embodiment, the electronic device 100 may output the class based on the output identified in operation 487. The electronic device 100 may set at least one parameter of the model based on the output class and label in operation 489. In operation 491, the electronic device 100 may identify the classification model using the set parameter. For example, the electronic device 100 may learn the classification model in such a manner as to set at least one parameter of the model based on a difference between class and label (e.g., a difference between the output value and labeled value). The electronic device 100 may learn the classification model by performing the above-described operations based on multiple pieces of data for learning. The use of split subfeatures may reduce the dimension and thus overfitting. Further, the parameters for the subfeatures may be further optimized by calculating the loss function (e.g., weighted loss function) (e.g., $loss_0$, $loss_1$, $loss_2$, $loss_3$, . . . , $loss_k$) on each of the split subfeatures, and a robust classification model may be generated and learned for noise-containing learning data. The electronic device 100 may learn the classification model so that the loss function sum 480 is minimized and/or reduced. The electronic device 100 may adjust the parameters of the classification model so that the loss function sum 480 and/or at least part of the loss function meets a designated condition.

Figure 5A:
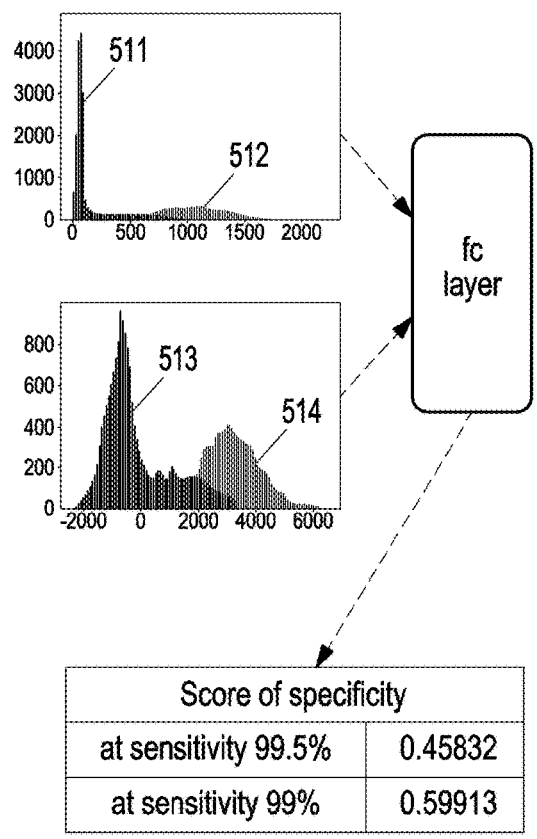
FIGS. 5A and 5B are histograms illustrating an example of identifying performance according to an embodiment.
Figure 5B:
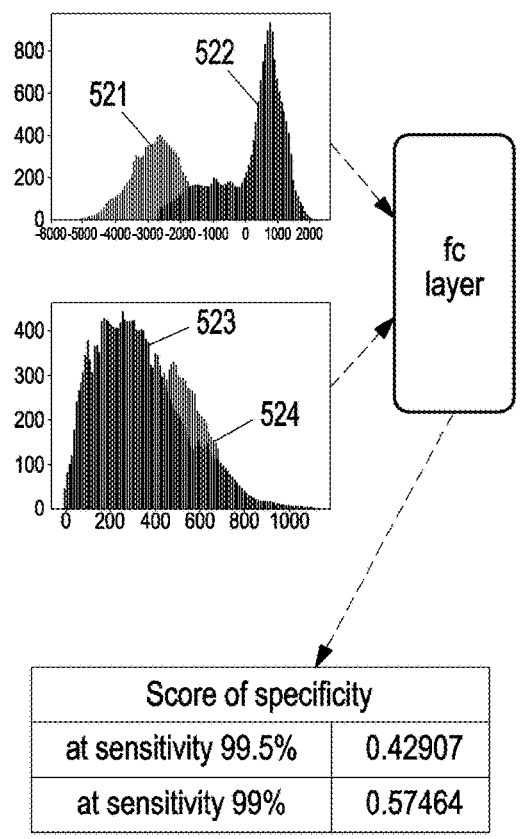

FIGS. 5A and 5B are histograms illustrating an example of identifying performance according to an embodiment. For example, the electronic device 150 may forward-advance image data (e.g., a metal surface defect data set) for the classification model (e.g., a metal surface defect recognition model) and identify a feature elements histogram between the subgroup (e.g., a subfeature) with the lowest score and the subgroup with the highest score. This may represent, e.g., per-class feature element produce. For example, with reference to FIG. 5A, the electronic device 150 may select two subgroups (e.g., subfeatures) for comparison. The electronic device 150 may identify a first histogram group 511 and a second histogram group 512 and identify that the histogram overlapping degree between the groups is 0.3294209. The overlapping degree may be represented as a ratio of the sum of all the frequencies (bin) of the second histogram group 512 to the sum of the smaller (e.g., min ($hist^1_j$, $hist^2_j$)) of the first histogram 511 and the second histogram 512. By a similar process, the electronic device 150 may identify the overlapping degree (e.g., 0.4629326) between the third histogram group 513 and the fourth histogram group 514. The electronic device 150 may identify that the classification model has a specificity of 0.45832 at a sensitivity of 99.5% and a specificity of 0.59913 at a sensitivity of 99% based on the above results. Sensitivity may refer to a measurement of image clearly recognized in a positive class image and may be called, e.g., a recall ratio. Thus, the value resulting from deducting the sensitivity from 100% may represent a proportion at which classification for a specific class fails. If a tumor image is defined as a positive class, a lower sensitivity may cause a fatal result, and the classification model needs to be tuned based on various schemes, e.g., adjusting the threshold or other parameters. Specificity may refer, for example, to a proportion of detection of the negative class when the sensitivity is the measurement for the positive class. If the threshold is adjusted to enhance sensitivity, the recall ratio for the negative class may be reduced. Thus, the performances of several classification models may be compared using the specificity under the same high-sensitivity condition. In sum, the sensitivity and specificity may be calculated as shown in Equations 1 and 2 below.

$$\text{sensitivity} = \frac{\text{true positives}}{\text{true positives} + \text{false negatives}} \quad \text{[Equation 1]}$$

$$\text{specificity} = \frac{\text{true negatives}}{\text{true negatives} + \text{false positives}} \quad \text{[Equation 2]}$$

Additionally, with reference to FIG. 5B, the electronic device 150 may identify the overlapping degree (e.g., 0.4682843) between the fifth histogram group 521 and the sixth histogram group 522 and the overlapping degree (e.g., 0.6615172) between the seventh histogram group 523 and the eighth histogram group 524. Based thereupon, the electronic device 150 may identify that the classification model has a specificity of 0.42907 at a sensitivity of 99.5% and a specificity of 0.57464 at a sensitivity of 99%. The electronic device 150 may use groups for which the overlapping degree is low or subgroups with a lower specificity at the same sensitivity.

Figure 6A:
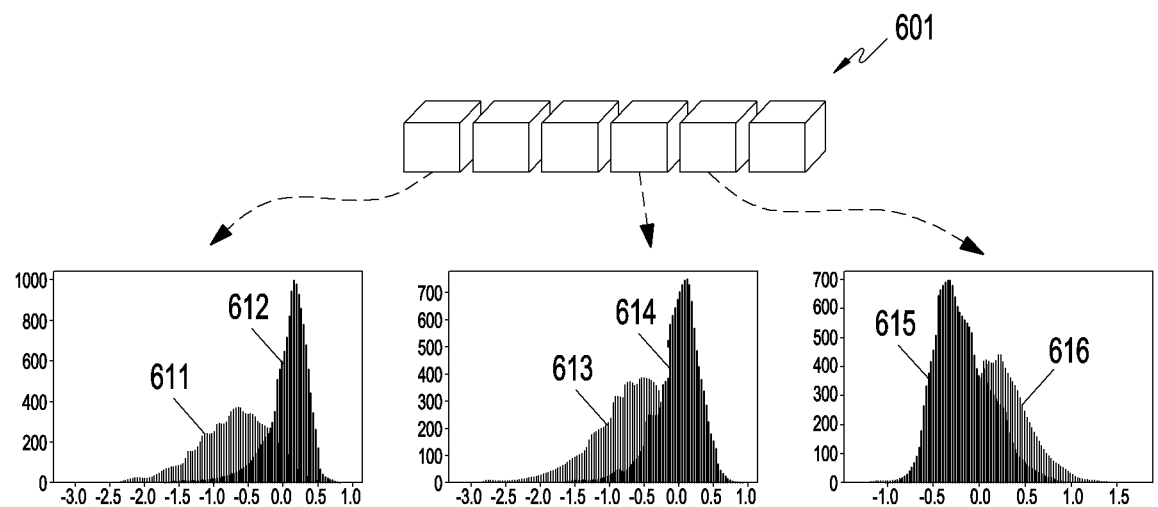
FIGS. 6A and 6B are histograms illustrating an example of performance comparison between a comparative example and an embodiment.
Figure 6B:
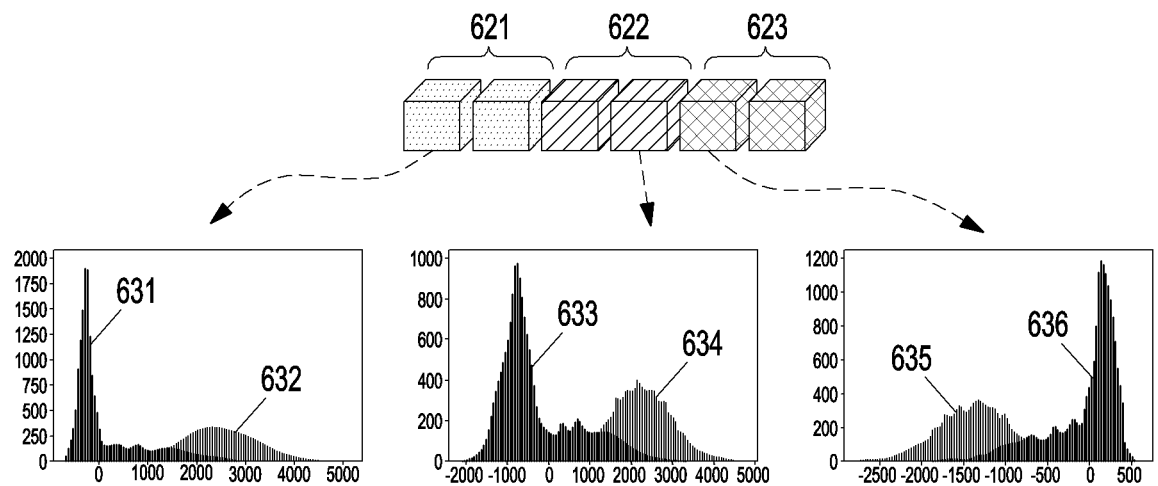

FIGS. 6A and 6B are histograms illustrating an example of performance comparison between a comparative example and an embodiment.

For example, according to a comparative example, the electronic device may identify the results as shown in FIG. 6A considering the ResNet50-based weighted loss and the results as shown in FIG. 6B considering the weighted loss when a split layer according to an embodiment is applied to ResNet50. For example, the electronic device 150 may randomly select a feature element from the last layer of the 1,000 dimension during the processes of FIGS. 6A and 6B and may identify the histogram for the randomly selected feature element. For example, as shown in FIG. 6A, the electronic device 150 may identify first/second histograms 611 and 612, third/fourth histograms 613 and 614, and fifth/sixth histograms 615 and 616 for three subgroups from the last layer 601 in the comparative example where no split layer applies. The electronic device 150 may calculate the mean histogram overlapping degree (e.g., 0.776589). Further, the electronic device 150 may identify first/second histograms 631 and 632, third/fourth histograms 633 and 634, and fifth/sixth histograms 635 and 636 for three subgroups from the last layer 621, 622, and 623 in an embodiment where a split layer applies. The electronic device 150 may calculate the mean histogram overlapping degree (e.g., 0.431766). As described above, it may be identified that when a split layer applies, the mean histogram overlapping degree may be smaller than when no split layer applies and, thus, classes may be further clearly differentiated, so that a more robust classification model may be obtained in a noisy environment.

Figure 7:
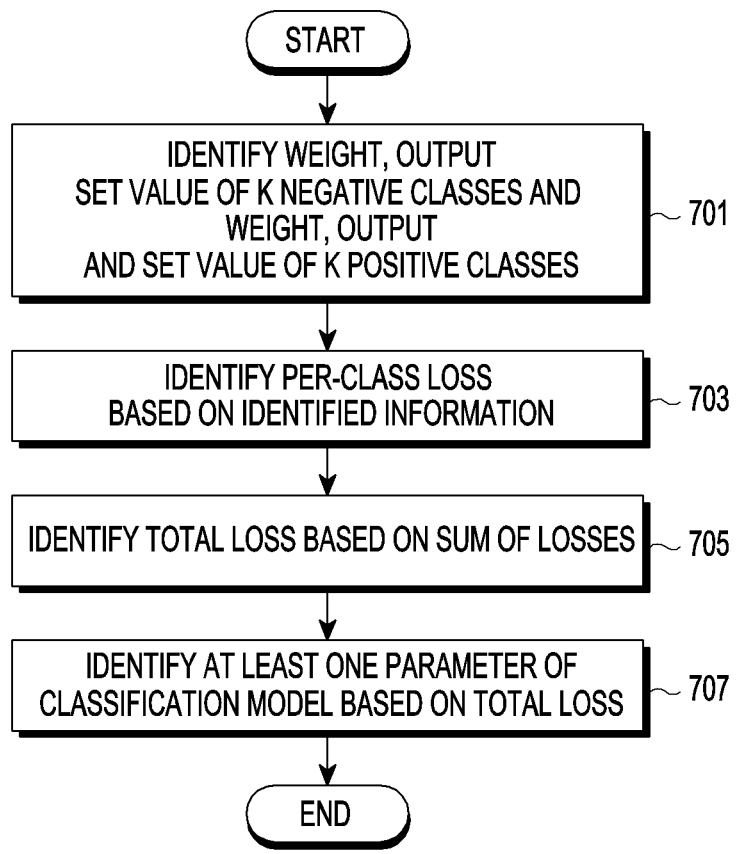
FIG. 7 is a flowchart illustrating an example method for operating an electronic device according to an embodiment.

FIG. 7 is a flowchart illustrating an example method for operating an electronic device according to an embodiment.

According to an embodiment, in operation 701, the electronic device 100 may identify the weight, output, and set value of k negative classes, and the weight, output, and set value of k positive classes. In operation 703, the electronic device 100 may identify per-class loss based on the identified information. The electronic device 100 may perform forward-processing on data for learning for the classification model for classifying, e.g., two classes (e.g., negative class/positive class). The electronic device 100 may calculate the weighted cross entropy joint loss per class. For example, the weighted loss (loss w) may be calculated as shown in Equation 3.

$$\text{loss}_w = \omega_n * Y_n * \log(X_n) + \omega_p * Y_p * \log(X_p) \quad \text{[Equation 3]}$$

$\omega_n$ may refer, for example, to the weight corresponding to the negative class. $Y_n$ may refer, for example, to the set value which may be 1 if the ground truth is negative and, otherwise, 0. $X_n$ may refer, for example, to the expected value for the negative class. $\omega_p$ may refer, for example, to the weight corresponding to the positive class. $Y_p$ may be the set value which may be 1 if the ground truth is positive and, otherwise, 0. $X_p$ may be the expected value for the positive class. For example, the electronic device 100 may divide data set classes into material classes (positive class) and immaterial classes (negative class). The material class may cause a fatal result if detection fails and, thus, a larger weight may be applied thereto in the learning process. Weights may not guarantee the optimization of a specific class at the optimal sensitivity and, thus, the result may be varied depending on the data features. Thus, the electronic device 100 may identify the total loss based on the sum of losses in operation 705. For example, the total loss ($\text{loss}_{total}$) may be expressed as shown in Equation 4.

$$\text{loss}_{total} = \frac{\sum_{k=0}^{N} \text{loss}_{wk}}{N} \quad \text{[Equation 4]}$$

In Equation 4, k may refer, for example, to the kth output layer. The electronic device may perform learning for reducing the total loss so that the per-class weight and/or parameters in the classification model may be determined in such a tendency as to reduce the total loss in operation 707.

Described below are various experimental examples in which performance may be identified according to various embodiments.

According to an embodiment, comparison may be made as to high-sensitivity classification performance using the specificity at fixed sensitivity ratio points. For example, three kinds of data may be used one of which is a metal surface defect data set which may be obtained, e.g., in an actual smart factory environment. The other two may be MNIST-M or CIFAR-10. It may be identified by using the three kinds of data sets that the split feature may be varied depending on the complexity of a feature combination for differentiating an image. The metal surface defect data set and MNIST-M may have a simple feature in the center of various kinds of background texture. The metal surface defect data set may include scratches or stains, and MNIST-M may have numbers. Although the background has various patterns, the features for classification may be simple. However, CIFAR-10 may differ from the other two data sets. For example, a combination of various features, such as wheel, body shape, and color, may be needed to recognize a vehicle. Thus, image data of complicated features need to be selected.

For the two known data sets, two prerequisites for experiment may be set. The first is that all labels may be integrated into two. For example, all data may be divided into two categories (e.g., material class (positive class) and immaterial class (negative class)). The second is that 30% of the labels of a data set cause noise. Further, an additional two prerequisites may be set for all of the three data sets. ResNet-50 may be used as a default CNN model of ImageNet Pretrained Model for weight initialization. If the epoch is identified to indicate the optimal specificity ratio, an early stopping method may be used. The metal surface defect data set may be obtained in an actual smart factory environment. For example, a cropped image patch including defect candidate areas may be used, which has a size of 129×129 as experimental data. In this experiment, 160,622 pieces of data for learning and 29,104 pieces of data for verification were used. Two types of classes may be set, e.g., defect (scratch or foreign body) class and defect-free (clean or tiny foreign body) class. The data set has two major points. First, since image similarity between the different classes is very high, classification may be difficult. Second, since data is obtained very quickly in the smart factory environment, noise may be caused in the labeling process. A proper weight for feature split experiment may be experimentally identified.

Figure 8A:
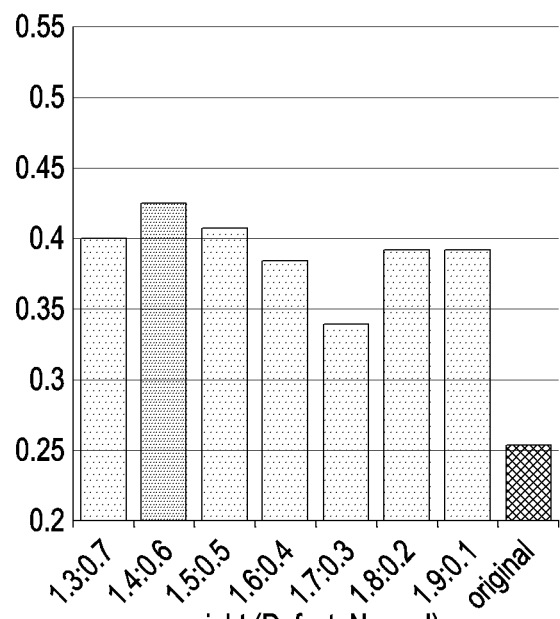
FIGS. 8A and 8B are diagrams illustrating an example metal surface defect data set according to an embodiment.
Figure 8B:
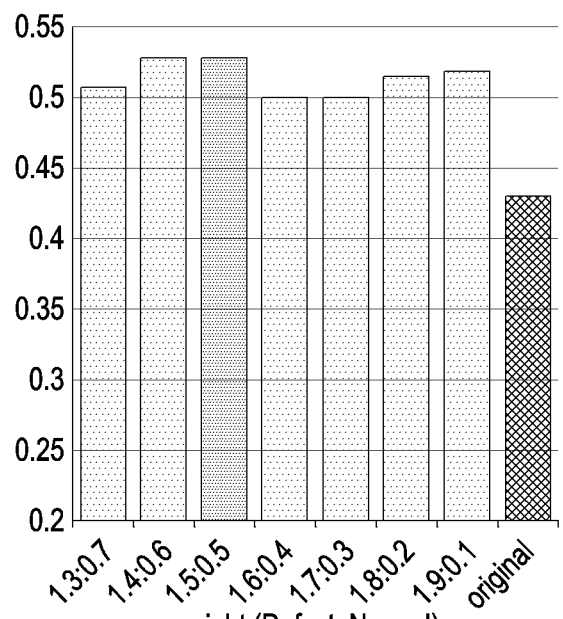
Figure 9A:
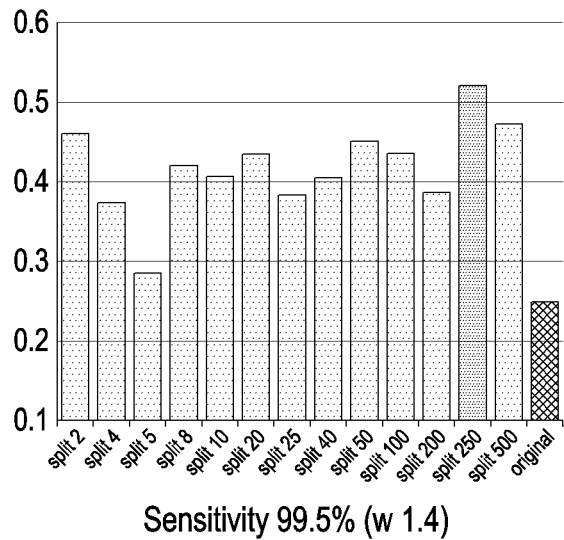
FIGS. 9A, 9B, 9C and 9D are diagrams illustrating specificity under various conditions according to an embodiment.
Figure 9B:
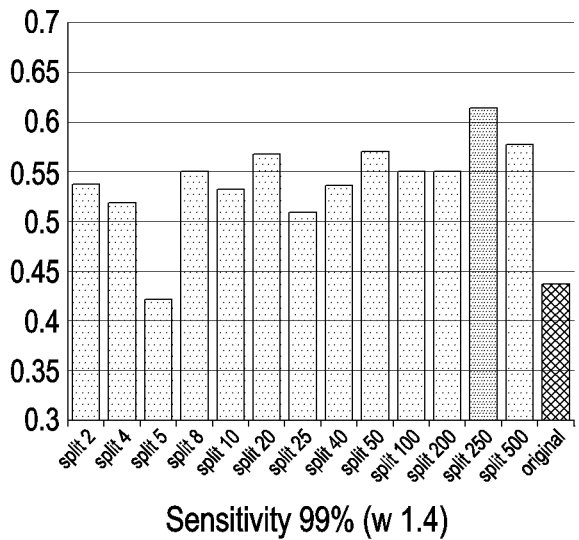
Figure 9C:
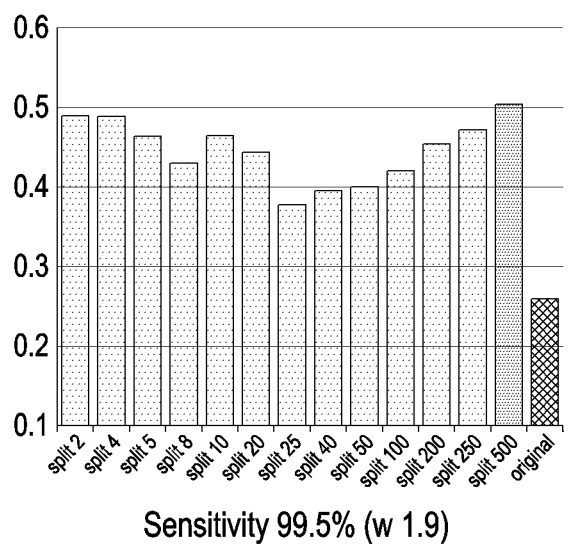
Figure 9D:
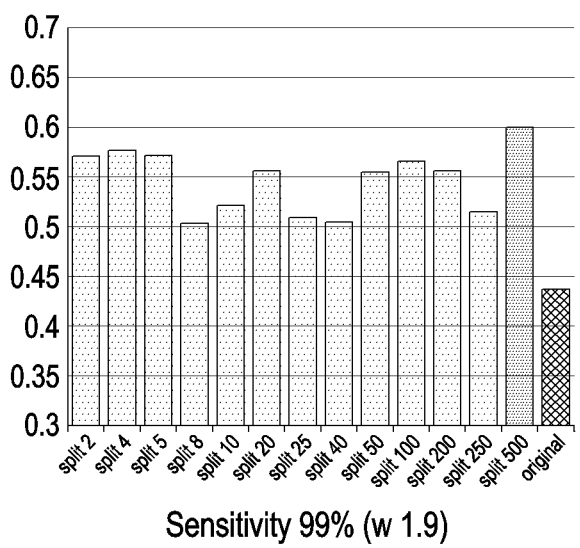

FIGS. 8A and 8B are diagrams illustrating an example metal surface defect data set according to an embodiment. FIG. 8A may illustrate a classification performance of negative class when the sensitivity of positive class is 99.5%. FIG. 8B may illustrate a classification performance of negative class when the sensitivity of positive class is 99%. A typical ResNet 50 model may be marked as original, and the others may be models using the weighted softmax cross entropy loss. All of the unbalanced weighted models may be identified to show a better performance in all scenario cases than the balanced model. The weights may be assigned for seven types of immaterial labels as shown in FIGS. 8A and 8B. After the weight experiment, two weights which show the best performance may be selected, and a feature split experiment may then be performed. To identify the effects of feature split, an experiment was performed on a basic model, weighted model, and feature split models according to 11 split schemes (e.g., split schemes in different split sizes, e.g., 2, 4, 5, 8, 10, 20, 25, 40, 50, 100, 200, 250, and 500). As the weights, 1.4:0.6 and 1.9:0.1, the ratios selected as a result of the experiment of FIGS. 8A and 8B were used. FIG. 9A illustrates the performance when the weights are set to 1.4:0.6 and the sensitivity is 99.5%. FIG. 9B illustrates the performance when the weights are set to 1.4:0.6 and the sensitivity is 99%. FIG. 9C illustrates the performance when the weights are set to 1.9:0.1 and the sensitivity is 99.5%. FIG. 9D illustrates the performance when the weights are set to 1.9:0.1 and the sensitivity is 99%. It may be identified that the split scheme shows better differentiability than the other schemes (basic scheme and weighted scheme) in all the circumstances.

Table 1 shows the results of performance comparison.

TABLE 1

| model | specificity | |
|---|---|---|
| | sensitivity 99.5% | sensitivity 99% |
| regular CNN | 0.2528 | 0.4361 |
| 1.4 weighted model | 0.4244 | 0.5287 |
| forward model | 0.3718 | 0.5363 |
| backward model | 0.3305 | 0.4609 |
| D2L model | 0.3236 | 0.5027 |
| 1.4 weighted-forward model | 0.3497 | 0.5430 |
| 1.4 weighted-backward model | 0.4014 | 0.5451 |
| 1.4 weighted-D2L model | 0.3461 | 0.4964 |
| 1.4 weighted-250 split model | 0.5203 | 0.6126 |
| 1.4 weighted-100 split model | 0.4816 | 0.5772 |
| 1.4 weighted-500 split model | 0.5053 | 0.5991 |

The forward model and backward model may require the noise ratio data as the hyper-parameter. Since the metal surface defect data set is unable to measure the noise ratio, the experiment was performed, with noise ratios 10%, 20%, and 30% applied. Further, an algorithm of weighted loss was learned. As identified from Table 1, the 250-split scheme exhibited the best performance.

The results of experiment on the MNIST-M data set are described below. MNIST-M may be handwritten number image data which may be the MNIST or may be a data set harder to recognize. MNIST-M has a size of 32×32, and the background may have various texture patterns. The numbers may have various shapes and colors and it may be difficult to differentiate the data. In the instant experiment, an even-number class and an odd-number class may be set. In the experiment, odd numbers may be set as critical classes, and 10 classes may be divided into even numbers and odd numbers. The sensitivity of the odd-number classes may be set to 99.5% or 99%, and the label noise may be set to 30%. Table 2 represents the specificity for various models.

TABLE 2

| model | specificity | |
|---|---|---|
| | sensitivity 99.5% | sensitivity 99% |
| regular CNN | 0.6344 | 0.7697 |
| 1.3 weighted model | 0.7604 | 0.8044 |
| forward model | 0.8059 | 0.8997 |
| backward model | 0.6347 | 0.7654 |
| D2L model | 0.7099 | 0.8738 |
| 1.3 weighted-forward model | 0.8147 | 0.8925 |
| 1.3 weighted-backward model | 0.6842 | 0.7958 |
| 1.3 weighted-D2L model | 0.8280 | 0.8851 |
| 1.3 weighted-200 split model | 0.8005 | 0.8567 |
| 1.3 weighted-20 split model | 0.7760 | 0.8242 |

The feature split experiment was performed while changing the weight ratio from 1.1:0.9 to 1.9:0.1, and 1.3:0.7 was selected. In such weight ratio, the peak split number may be 200. Referring to Table 2, a relatively high sensitivity may be shown in the split models.

The results of experiment on the CIFAR-10 data set are described below. CIFAR-10 may be a cropped object image which is sized to be 32×32 and has 10 classes. In this experiment, 10 labels were divided into two types: vertebrate and vehicle. Table 3 represents the relationship between the label of CIFAR-10 and the two classes in the experiment.

TABLE 3

| binary class | label of CIFAR-10 |
|---|---|
| vertebrate | bird, cat, deer, dog, frog, horse |
| vehicle | airplane, automobile, ship, truck |

The experiment may be performed with the 1,000 feature vector split to a size of 2 and a size of 4. Table 4 represents the specificity for various models.

TABLE 4

| model | specificity | |
|---|---|---|
| | sensitivity 99.5% | sensitivity 99% |
| regular CNN | 0.9463 | 0.9688 |
| 1.05 weighted model | 0.9575 | 0.9765 |
| forward model | 0 | 0 |
| backward model | 0 | 0 |

TABLE 4-continued

| model | specificity | |
| --- | --- | --- |
| | sensitivity 99.5% | sensitivity 99% |
| D2L model | 0 | 0 |
| 1.05 weighted-forward model | 0 | 0 |
| 1.05 weighted-backward model | 0 | 0 |
| 1.05 weighted-D2L model | 0 | 0 |
| 1.05 weighted-4 split model | 0.9543 | 0.9798 |
| 1.05 weighted-5 split model | 0.9573 | 0.9745 |
| 1.05 weighted-2 split model | 0.9675 | 0.9805 |

As identified from Table 4, the 2-size split scheme exhibited the best performance.

As set forth above, if the non-classification ratio is limited to 1% or less, the split layer-applied model may have an about 20%-enhanced specificity as compared with the conventional CNN.

The electronic device according to various example embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, there may be provided an electronic device that splits a feature vector (or feature image) obtained via a convolution layer to a designated size and performs learning using the split layers to thereby provide a classification model and a method for operating the same. According to various embodiments, there may be provided an electronic device that may classify classes of input data using a classification model including split layers and a method for operating the same.

While the disclosure has been illustrated and described with reference to various example embodiments thereof, it will be understood by those skilled in the art that various changes in form and details may be made therein without departing from the spirit and scope of the disclosure, including the appended claims and their equivalents.

What is claimed is:

1. An electronic device, comprising:
   at least one processor; and
   a memory, wherein the memory stores instructions to be executed by the at least one processor, wherein the at least one processor is configured to control the electronic device to:
   obtain data to be classified,
   load a classification model stored in the memory,
   obtain a plurality of feature maps from the data at least by performing convolution on the data and a plurality of filters at least by using a convolution layer of the classification model,
   obtain feature vectors from the plurality of feature maps at least by using a single layer of the classification model,
   obtain subfeatures at least by using a split layer of the classification model including the subfeatures resulting from splitting the feature vectors, and
   output a class corresponding to the data based on output vectors corresponding to the subfeatures at least by using an output layer of the classification model.

2. The electronic device of claim 1, wherein the number of the outputs corresponds to the number of features included in the split layer, and wherein each of the outputs includes a plurality of values corresponding to the number of candidate classes.

3. The electronic device of claim 1, wherein the instructions, when executed, cause the at least one processor to: identify the plurality of feature maps by performing convolution, padding, and/or pulling based on sliding each of the plurality of filters for the data.

4. A non-transitory computer-readable storage medium storing instructions that, when executed, cause an electronic device to perform operations for classifying data to be classified, the operations comprising:
   obtaining the data to be classified;
   loading a classification model stored in the memory;
   obtaining a plurality of feature maps from the data by performing convolution on the data and a plurality of filters by using a convolution layer of the classification model;
   obtaining feature vectors from the the plurality of feature maps by using single layer of the classification model,
   obtaining subfeatures by using a split layer of the classification model including the subfeatures resulting from splitting the feature vectors, and
   outputing a class corresponding to the data based on output vectors corresponding to the subfeatures by using a output layer of the classification model.

5. The non-transitory computer readable storage medium of claim 4, wherein the number of the outputs corresponds to the number of features included in the split layer, and wherein each of the outputs includes a plurality of values corresponding to the number of candidate classes.

6. The non-transitory computer readable storage medium of claim 4, wherein the operations further comprising: identifying the plurality of feature maps by performing convolution, padding, and/or pulling based on sliding each of the plurality of filters for the data.

7. An electronic device, comprising:
   at least one processor; and
   a memory, wherein the memory stores instructions to be executed by the at least one processor, wherein the at least one processor is configured to control the electronic device to:
   obtain data to be classified;
   load a classification model stored in the memory;
   obtain a plurality of feature maps from the data at least by performing convolution on the data and a plurality of filters at least by using a convolution layer of the classification model;
   obtain feature vectors from the plurality of feature maps at least by using a layer of the classification model,
   obtain subfeatures at least by using a split layer of the classification model including the subfeatures resulting from splitting the feature vectors,
   output a class corresponding to the data based on output vectors corresponding to the subfeatures at least by using an output layer of the classification model, and
   perform a learning of the data and the output vectors, and
   adjust at least one parameter of the classification model based on a loss based on labeling information associated with the learning of the data and the output vectors.

8. The electronic device of claim 7, wherein the number of the outputs corresponds to the number of features included in the split layer, and wherein each of the outputs includes a plurality of values corresponding to the number of candidate classes.

9. The electronic device of claim 7, wherein the instructions, when executed, cause the at least one processor to control the electronic device, as at least part of adjusting the at least one parameter of the classification model based on the loss based on the labeling information associated with the learning the data and the output vectors, to identify a sum of losses corresponding to the output vectors and adjust the at least one parameter of the classification model to allow the sum of the losses to be minimized and/or reduced.

10. A non-transitory computer-readable storage medium storing instructions that, when executed, cause an electronic device to perform operations for learning a classification model using data for learning, the operations comprising:
    obtaining data to be classified;
    loading a classification model stored in the memory;
    obtaining a plurality of feature maps from the data at least by performing convolution on the data and a plurality of filters at least by using a convolution layer of the classification model;
    obtaining feature vectors from the plurality of feature maps by using a single layer of the classification model,
    obtaining subfeatures at least by using a split layer of the classification model including the subfeatures resulting from splitting the feature vectors,
    outputing a class corresponding to the data based on output vectors corresponding to the subfeatures at least by using a output layer of the classification model, and
    performing a learning of the data and the output vectors, and
    adjusting at least one parameter of the classification model based on a loss based on labeling information associated with the learning of the data and the output vectors.

11. The non-transitory computer readable storage medium of claim 10, wherein the number of the outputs corresponds to the number of features included in the split layer, and wherein each of the outputs includes a plurality of values corresponding to the number of candidate classes.

12. The non-transitory computer readable storage medium of claim 10, wherein adjusting the at least one parameter of the classification model based on the loss based on the labeling information associated with the learning of the data and the output vectors includes identifying a sum of losses corresponding to the output vectors and adjusting the at least one parameter of the classification model to allow the sum of the losses to be minimized and/or reduced.

* * * * *